(12) United States Patent
Yi

(10) Patent No.: US 9,734,307 B2
(45) Date of Patent: Aug. 15, 2017

(54) USER TERMINAL INTERWORKING WITH PERIPHERAL DEVICE AND METHOD FOR PREVENTING LEAKAGE OF INFORMATION USING THE SAME

(71) Applicant: Soongsil University Research Consortium Techno-Park, Seould (KR)

(72) Inventor: Jeong-Hyun Yi, Seongnam-si (KR)

(73) Assignee: Soongsil University Research Consortium Techno-Park, Seoul (KR)

( * ) Notice: Subject to any disclaimer, the term of this patent is extended or adjusted under 35 U.S.C. 154(b) by 120 days.

(21) Appl. No.: 14/787,275

(22) PCT Filed: Mar. 6, 2015

(86) PCT No.: PCT/KR2015/002208
§ 371 (c)(1),
(2) Date: Oct. 27, 2015

(87) PCT Pub. No.: WO2016/085050
PCT Pub. Date: Jun. 2, 2016

(65) Prior Publication Data
US 2017/0032110 A1 Feb. 2, 2017

(30) Foreign Application Priority Data

Nov. 26, 2014 (KR) .................. 10-2014-0166360
Jan. 8, 2015 (KR) .................. 10-2015-0002945

(51) Int. Cl.
*G06F 21/12* (2013.01)
*H04L 9/32* (2006.01)
(Continued)

(52) U.S. Cl.
CPC .............. *G06F 21/12* (2013.01); *G06F 8/61* (2013.01); *G06F 21/70* (2013.01); *H04L 9/32* (2013.01)

(58) Field of Classification Search
None
See application file for complete search history.

(56) References Cited

U.S. PATENT DOCUMENTS

2011/0181902 A1* 7/2011 Chiba ................ H04N 1/00204
358/1.13
2012/0233674 A1* 9/2012 Gladstone ............... H04L 9/085
726/6
2015/0082445 A1* 3/2015 Chen ....................... G06F 21/60
726/26

FOREIGN PATENT DOCUMENTS

KR        10-1392116 B1     5/2014

\* cited by examiner

*Primary Examiner* — Fatoumata Traore
(74) *Attorney, Agent, or Firm* — Daly, Crowley, Mofford & Durkee, LLP

(57) ABSTRACT

A user terminal includes a communication circuit, a certification circuit, an execution circuit, and a control circuit. The communication circuit receives a normal code of an application from an application providing server to install the application. The certification circuit receives a registration request message, which includes distinct information of a peripheral device, from the peripheral device storing a core code of the application, to certify the peripheral device, transmits a registration response message, which includes distinct information of the user terminal, to the peripheral device, and receives the core code of the application from the peripheral device. The execution circuit executes the application using the normal code and the core code. The control circuit restricts at least one of functions of the user terminal while the application is executed.

8 Claims, 3 Drawing Sheets

(51) Int. Cl.
*G06F 9/445* (2006.01)
*G06F 21/70* (2013.01)

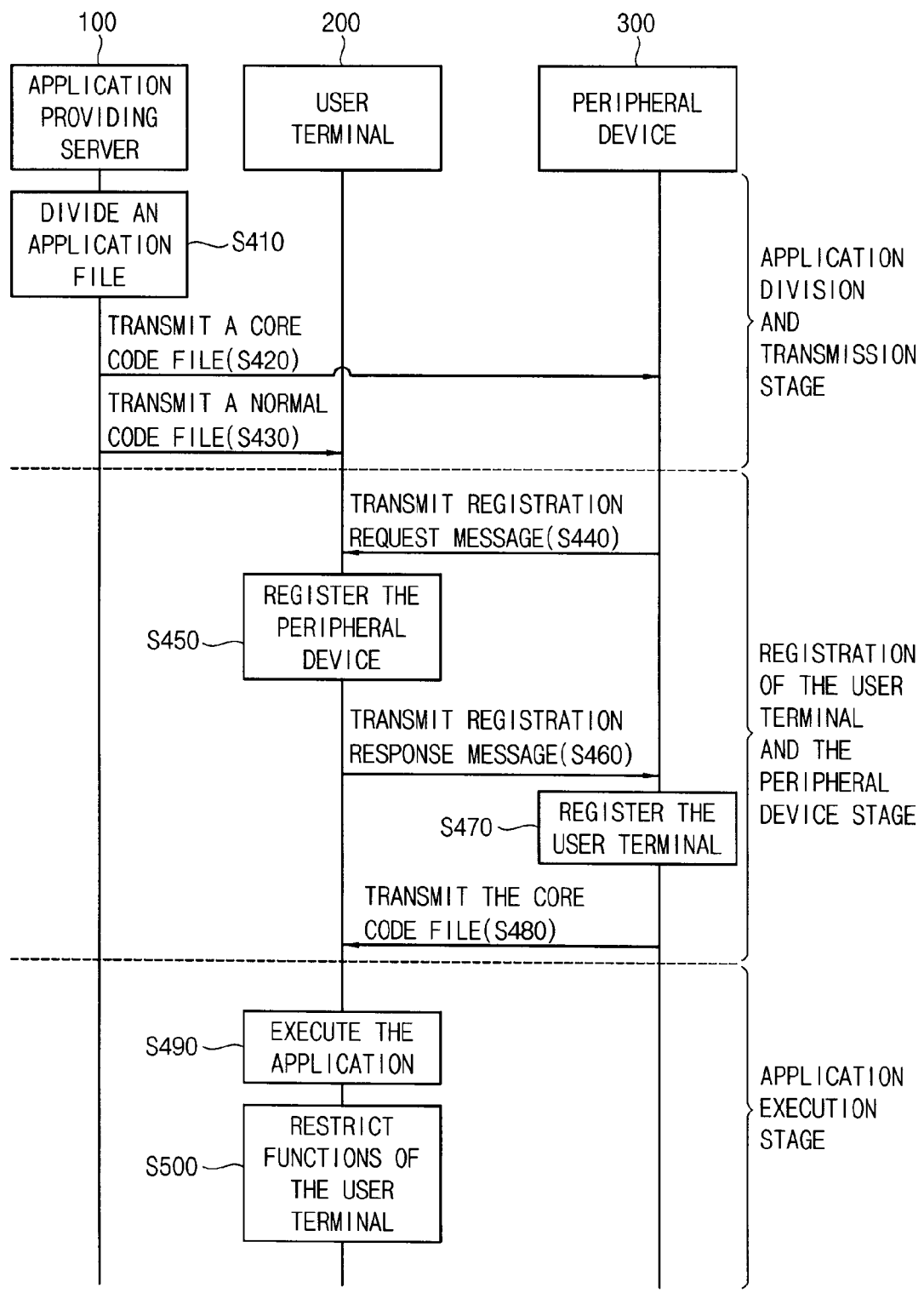

USER TERMINAL INTERWORKING WITH PERIPHERAL DEVICE AND METHOD FOR PREVENTING LEAKAGE OF INFORMATION USING THE SAME

CROSS REFERENCE TO RELATED APPLICATIONS

This application is a U.S. National Stage of PCT application PCT/KR2015/002208 filed in the Korean language on Mar. 6, 2015, entitled "USER TERMINAL INTERWORKING WITH PERIPHERAL DEVICE AND METHOD FOR PREVENTING LEAKAGE OF INFORMATION USING THE SAME," which claims priority to Korean application 10-2014-0166360, filed on Nov. 26, 2014 and Korean application 10-2015-0002945, filed on Jan. 8, 2015, which applications are each hereby incorporated herein by reference in their entireties.

THE ART TO WHICH THE INVENTIVE CONCEPT

Example embodiments generally relate to user terminals interworking with peripheral devices and methods for preventing leakage of information using the user terminals, and more particularly relate to methods for preventing leakage of internal information through a user terminal that is brought in a company or an organization.

BACKGROUND OF THE INVENTIVE CONCEPT

Companies expend a lot of efforts and money to protect their confidential information. Leakage of confidential information may be occurred by an attack from outside or by an internal user. Conventionally, confidential information was normally leaked by an attack from outside, such as a hacking, virus, etc. However, as information technology advances, leakage of confidential information by an internal user increases.

Security managers of companies installs security devices, uses security operation services, and applies digital rights management (DRM) and data loss prevention (DLP) solutions in their systems to increase a security level.

The digital rights management (DRM) represents a technology that prevents digital contents from being tampered to protect rights and profits of developers of the digital contents. The data loss prevention (DLP) solution represents a solution that prevents intentional or accidental leakage of confidential information by an internal user. Using the data loss prevention (DLP) solution, data transmitted between internal uses may be monitored based on a content or a format of the data to prevent a leakage of confidential information.

Recently, solutions to prevent a leakage of confidential information through terminals of outsiders that are brought in a company have been developed. As a mobile internet and a mobile device advances, more companies choose BYOD (Bring Your Own Device) policy. In this regard, many companies adopt a wireless network access control (WNAC) solution for an access control of a terminal brought in the company.

The wireless network access control (WNAC) solution checks statuses of all terminals accessing to the internal network, and permits an access to the internal network only when a terminal has a guaranteed security level. The wireless network access control (WNAC) solution may be operated alone, or in combination with other security solutions, such as a vaccine solution, a digital rights management (DRM) solution, a data loss prevention (DLP) solution, etc.

However, conventional solutions require a management server for an integrated management of a management program installed in each of user terminals, and each of the user terminals is required to communicate with the management server through a network. If an error occurs in the communication between the management server and the management program installed in the user terminal, the management program installed in the user terminal may not be controlled correctly.

The background art of the present invention has been described in Korean Patent Registration Publication No. 10-1392116 (2014, May 7).

CONTENT OF THE INVENTIVE CONCEPT

Technical Object of the Inventive Concept

Some example embodiments of the inventive concept provide a user terminal interworking with a peripheral device and a method for preventing leakage of internal information using the user terminal interworking with the peripheral device.

Means For Achieving the Technical Object

According to example embodiments, a user terminal includes a communication circuit, a certification circuit, an execution circuit, and a control circuit. The communication circuit receives a normal code of an application from an application providing server to install the application. The certification circuit receives a registration request message, which includes distinct information of a peripheral device, from the peripheral device storing a core code of the application, to certify the peripheral device, transmits a registration response message, which includes distinct information of the user terminal, to the peripheral device, and receives the core code of the application from the peripheral device. The execution circuit executes the application using the normal code and the core code. The control circuit restricts at least one of functions of the user terminal while the application is executed.

The application may include at least one of an enterprise resource planning (ERP), an enterprise information portal (EIP), an enterprise application integration (EAI), a groupware, and a knowledge management system (KMS).

The control circuit may restrict at least one of a communication function, a camera function, a voice recording function, a storage function, a file transfer function, and a global positioning system (GPS) function of the user terminal.

The distinct information of the user terminal may include at least one of an international mobile equipment identity (IMEI), an Android Identification (ANDROID_ID), a serial number, a phone number, a model number, and a media access control (MAC) address.

In a method for preventing leakage of information using a user terminal, the user terminal receives a normal code of an application from an application providing server to install the application, receives a registration request message, which includes distinct information of a peripheral device, from the peripheral device storing a core code of the application, to certify the peripheral device, transmits a registration response message, which includes distinct information of the user terminal, to the peripheral device, receives the core code of the application from the peripheral device, executes the application using the normal code and the core code, and restricts at least one of functions of the user terminal while the application is executed.

Effects of the Inventive Concept

Since some of functions of the user terminal, by which internal information may be leaked, is restricted by executing the application, a leakage of the internal information of the company can be prevented such that the internal information of the company can be effectively protected.

In addition, since the peripheral device, instead of the main server of the company, manages the user terminal, which is brought in the company, malfunction of a user terminal management system can be prevented, and whether the user terminal management system operates correctly can be checked intuitionally.

BRIEF DESCRIPTION OF THE DRAWINGS

FIG. 4 is a flow chart illustrating a method for preventing leakage of information according to example embodiments.

PARTICULAR CONTENTS FOR IMPLEMENTING THE INVENTIVE CONCEPT

Figure 1:
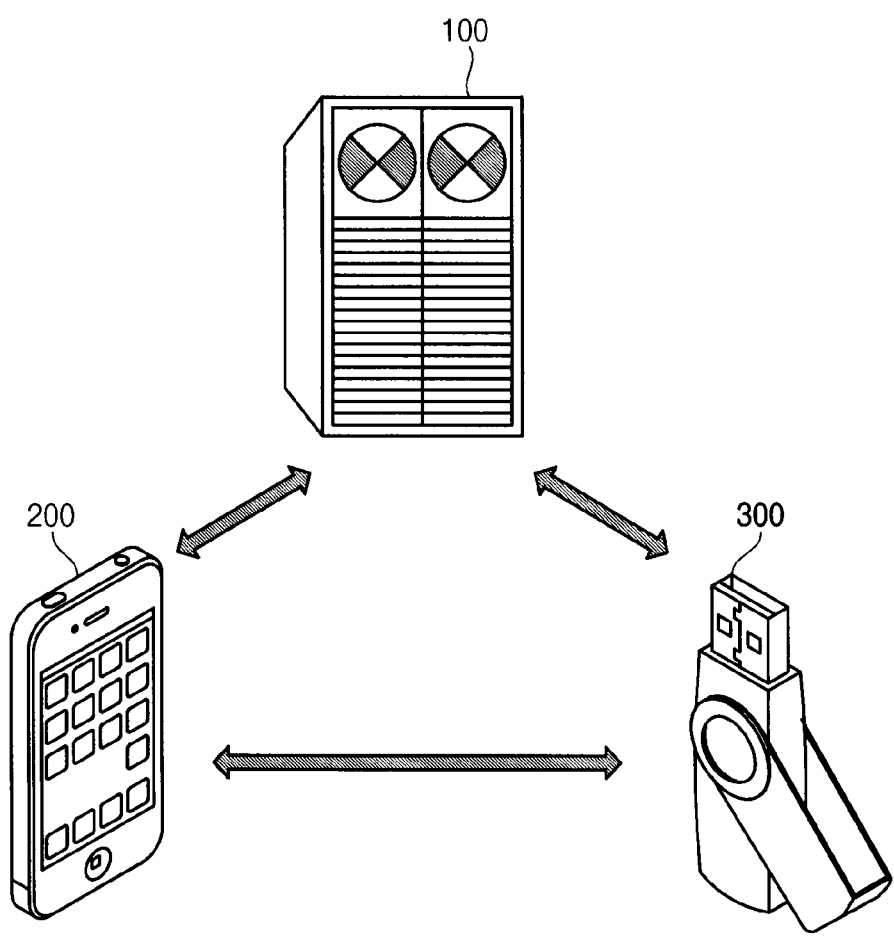
FIG. 1 is a diagram illustrating a system for preventing leakage of information according to example embodiments.

Various example embodiments will be described more fully with reference to the accompanying drawings, in which some example embodiments are shown. The present inventive concept may, however, be embodied in many different forms and should not be construed as limited to the embodiments set forth herein. Rather, these embodiments are provided so that this disclosure will be thorough and complete, and will fully convey the scope of the present inventive concept to those skilled in the art. Like reference numerals refer to like elements throughout this application.

Hereinafter, various example embodiments will be described fully with reference to the accompanying drawings.

FIG. 1 is a diagram illustrating a system for preventing leakage of information according to example embodiments.

Referring to FIG. 1, a system for preventing leakage of information includes an application providing server 100, a user terminal 200, and a peripheral device 300.

As illustrated in FIG. 1, the application providing server 100, the user terminal 200, and the peripheral device 300 may be connected by a network. That is, the user terminal 200 may be connected to the application providing server 100 and the peripheral device 300 by a network, and the peripheral device 300 may be connected to the application providing server 100 by a network.

Here, the network represents a connection structure capable of communicating data among nodes such as user terminals, servers, etc. The network may include an internet, local area network (LAN), wireless LAN, wide area network (WAN), personal area network (PAN), 3G network, 4G network, Wi-Fi, etc.

In some example embodiments, the user terminal 200 and the peripheral device 300 may be coupled wirelessly by Bluetooth, ZigBee, infrared data association (IrDA), etc. In other example embodiments, the user terminal 200 and the peripheral device 300 may be coupled by a wire.

The application providing server 100 may distribute an application by transmitting a core code file of the application to the peripheral device 300 and transmitting a normal code file of the application to the user terminal 200.

In some example embodiments, the application may include at least one of an enterprise resource planning (ERP), an enterprise information portal (EIP), an enterprise application integration (EAI), a groupware, a knowledge management system (KMS), etc.

The application providing server 100 may define a core code using an execution file, which is generated by decompiling an application package. The application providing server 100 may generate the normal code file by deleting the core code from the application file. Each of the core code file and the normal code file may have an executable file format such that the core code file and the normal code file may be installed in the peripheral device 300 and the user terminal 200, respectively.

The application providing server 100 according to example embodiments may store normal code files and core code files of various kinds of applications required for business of a company. The user terminal 200 and the peripheral device 300 may download and install the normal code file and the core code file of the application, respectively, from the application providing server 100.

In some example embodiments, the application providing server 100 may correspond to a mobile application market, such as Google Play, App Store of Apple, etc. In other example embodiments, the application providing server 100 may correspond to a main server of an internal network of the company or a stand-alone server.

The user terminal 200 may receive the normal code file of the application from the application providing server 100 and install the normal code file of the application in the user terminal 200. In addition, the user terminal 200 may establish a wireless or wired connection with the peripheral device 300 to receive the core code file corresponding to the normal code file from the peripheral device 300. In some example embodiments, the user terminal 200 may receive a request for a registration of the peripheral device 300 from the peripheral device 300, register the peripheral device 300 in the user terminal 200, and request the peripheral device 300 to register the user terminal 200 in the peripheral device 300 such that a connection between the user terminal 200 and the peripheral device 300 may be established.

The user terminal 200 may receive the core code file of the application from the peripheral device 300, which is connected with the user terminal 200, and execute the application. Some of functions of the user terminal 200 may be restricted by executing the application.

The user terminal 200 may correspond to any terminal having at least one of a communication function, a camera function, a voice recording function, a storage function, a file transfer function, and a global positioning system (GPS) function. For example, the user terminal 200 may be able to transmit a text message, make a phone call, and send a message using a messenger. In addition, the user terminal 200 may be able to capture a still image or a video, to record voice, to store data using a universal serial bus (USB) memory function, and to trace a location using a global positioning system (GPS) function.

The user terminal 200 may correspond to a terminal that is able to install an application and execute the application. For example, the user terminal 200 may include a smart phone, a smart pad, a cellular phone, a laptop computer, a tablet computer, a personal digital assistant (PDA), etc.

Here, the application represents a program executable on a terminal. For example, the application may include an app that is executed on a mobile terminal such as a smart phone. In some example embodiments, the user may download the application from a mobile application market at which mobile contents are traded, and install the application on the user terminal 200. In other example embodiments, the user may download the application from a main server of an internal network of the company, and install the application on the user terminal 200.

The application installed on the user terminal 200 may restrict at least one of a communication function, a camera function, a voice recording function, a storage function, a file transfer function, and a global positioning system (GPS) function of the user terminal 200.

The peripheral device 300 may receive the core code file of the application from the application providing server 100 and install the core code file of the application in the peripheral device 300. The peripheral device 300 may request the user terminal 200 to register the peripheral device 300 in the user terminal 200 by transmitting distinct information of the peripheral device 300 to the user terminal 200, and register the user terminal 200 in the peripheral device 300 by receiving distinct information of the user terminal 200 from the user terminal 200. After that, the peripheral device 300 may transmit the core code file of the application to the user terminal 200, which is registered in the peripheral device 300, such that the user terminal 200 may execute the application.

The peripheral device 300 may correspond to any electronic device that is able to communicate with the user terminal 200 and the application providing server 100, and to receive and store the core code file of the application. For example, the peripheral device 300 may include a wearable device, such as a smart watch, a smart glasses, a smart band, etc., and a storage device having a communication function, such as an external hard disk drive (HDD), a universal serial bus (USB), an On-The-Go (OTG), etc.

In some example embodiments, the peripheral device 300 may include an appcessory, such as an activity tracker, a mobile photo printer, a home monitoring device, a toy, a medical device, etc. Here, appcessory represents an accessory that broadens functions of the user terminal 200 (e.g., smart phone) in association with an application.

The company (or an organization) may manage the peripheral device 300 storing the core code file. To prevent a leakage of internal information of the company, the company may install the normal code file of the application in the user terminal 200, which is brought in the company, and lend a user of the user terminal 200 the peripheral device 300, in which the core code file of the application is installed.

If the normal code file of the application is not installed in the user terminal 200 or the user terminal 200 is not connected with the peripheral device 300, the user terminal 200 may not operate in the company. That is, the user terminal 200 may be required to be installed with the normal code file of the application and to be connected with the peripheral device 300 to operate in the company. The application installed in the user terminal 200 may restrict some of functions of the user terminal 200 although the user terminal 200 is operable in the company.

Figure 2:
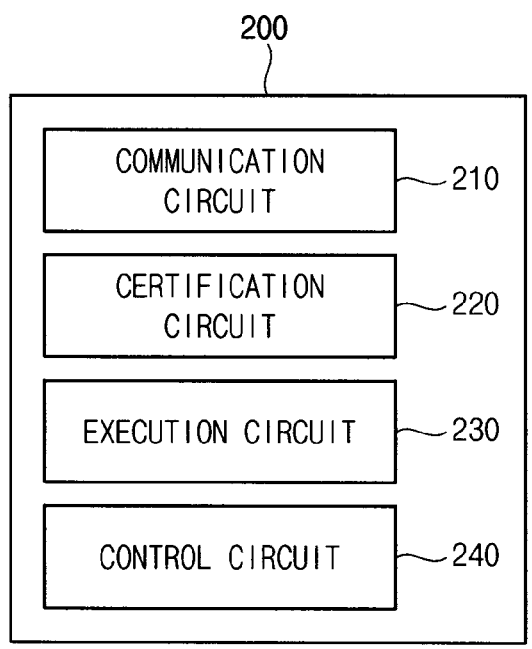
FIG. 2 is a block diagram illustrating a user terminal according to example embodiments.

FIG. 2 is a block diagram illustrating a user terminal according to example embodiments.

Referring to FIG. 2, a user terminal 200 may include a communication circuit 210, a certification circuit 220, an execution circuit 230, and a control circuit 240.

The communication circuit 210 may communicate with the application providing server 100 and the peripheral device 300. In some example embodiments, the communication circuit 210 may communicate with the application providing server 100 by a wireless communication scheme, such as Wi-Fi, 3G network, 4G network, long term evolution (LTE), Wibro, etc., or a wired communication scheme, and communicate with the peripheral device 300 by a wireless communication scheme, such as Bluetooth, ZigBee, infrared data association (IrDA), etc., or a wired communication scheme.

The communication circuit 210 may receive the normal code file of the application from the application providing server 100, and install the application on the user terminal 200.

The communication circuit 210 may receive a registration request message from the peripheral device 300, which receives the core code file of the application from the application providing server 100, transmit a registration response message to the peripheral device 300, and receive the core code file of the application from the peripheral device 300 after finishing the certification of the peripheral device 300.

The certification circuit 220 may certify the peripheral device 300 using the registration request message received from the peripheral device 300. After certifying the peripheral device 300, the certification circuit 220 may generate the registration response message and transmit the registration response message to the peripheral device 300 using the communication circuit 210.

The execution circuit 230 may execute the application using the normal code file of the application, which is received from the application providing server 100, and the core code file of the application, which is received from the peripheral device 300.

The control circuit 240 may control the user terminal 200 such that some of functions of the user terminal 200 may be restricted while the application is executed. In some example embodiments, the control circuit 240 may restrict at least one of a communication function, a camera function, a voice recording function, a storage function, a file transfer function, and a global positioning system (GPS) function of the user terminal 200.

Figure 3:
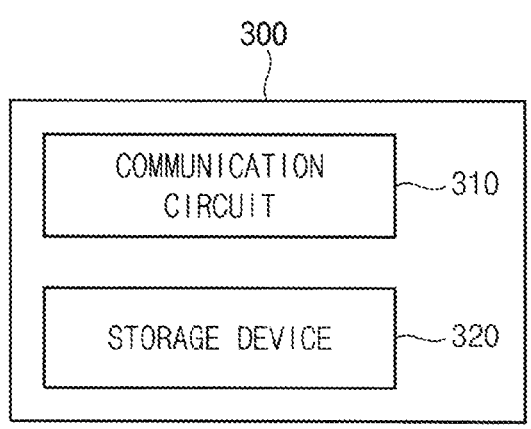
FIG. 3 is a block diagram illustrating a peripheral device according to example embodiments.

FIG. 3 is a block diagram illustrating a peripheral device according to example embodiments.

Referring to FIG. 3, a peripheral device 300 may include a communication circuit 310, and a storage device 320.

The communication circuit 310 may communicate with the application providing server 100 and the user terminal 200. During an application division and transmission stage of FIG. 4, the communication circuit 310 may receive the core code file of the application from the application providing server 100.

The communication circuit 310 may transmit the registration request message to the user terminal 200. The registration request message may include the distinct information of the peripheral device 300. In addition, the communication circuit 310 may receive the registration response message, which includes the distinct information of the user terminal 200, from the user terminal 200.

The storage device 320 may store the core code file, which is received from the application providing server 100.

In addition, the storage device 320 may store the distinct information of the user terminal 200 to register the user terminal 200.

Hereinafter, a method for preventing leakage of information according to example embodiments will be described with reference to FIG. 4.

FIG. 4 is a flow chart illustrating a method for preventing leakage of information according to example embodiments.

In the method for preventing leakage of information of FIG. 4, an application division and transmission stage may include steps S410 to S430, a registration of the user terminal and the peripheral device stage may include steps S440 to S480, and an application execution stage may include steps S490 and S500.

At first, the application providing server 100 may perform the application division and transmission stage through the steps S410 to S430.

The application providing server 100 may divide the application file into the core code file and the normal code file (step S410). For example, the application providing server 100 may define the core code using an execution file, which is generated by decompiling an application package, or a source code, and generate the core code file based on the core code. After that, the application providing server 100 may generate the normal code file, which includes the normal code only, by deleting the core code from the application file.

The application providing server 100 may transmit the core code file to the peripheral device 300 (step S420). In some example embodiments, the application providing server 100 may transmit the core code file to the peripheral device 300 by a wireless communication scheme, such as Wi-Fi, 3G network, 4G network, long term evolution (LTE), Wibro, etc., or by a near field communication or a wired communication to increase a security level.

When the user terminal 200 connects to the application providing server 100, the application providing server 100 may transmit the normal code file of the application to the user terminal 200 using a download scheme (step S430). The user terminal 200 may download the normal code file of the application through a network, such as 3G network, 4G network, Wi-Fi, etc., and installs the application using the normal code file.

In the method for preventing leakage of information of FIG. 4, the registration of the user terminal and the peripheral device stage may be performed when the user terminal 200 receives a command from the user to execute the application for the first time or when the peripheral device 300 is connected with the user terminal 200.

After finishing the application division and transmission stage, the user terminal 200 and the peripheral device 300 may connect to each other by registering the distinct information of the other party using the steps S440 to S480. If the user terminal 200 and the peripheral device 300 are already registered by the other party and are paired with each other, the steps S440 to S480 may be omitted.

The peripheral device 300, which stores the core code file of the application, may transmit the registration request message to the user terminal 200 (step S440). The registration request message may include the distinct information of the peripheral device 300. The distinct information of the peripheral device 300 may include a serial number of the peripheral device 300.

The user terminal 200 may register the peripheral device 300 using the distinct information of the peripheral device 300 included in the registration request message (step S450), and transmit the registration response message to the peripheral device 300 (step S460).

The registration response message may include the distinct information of the user terminal 200. By transmitting the registration response message to the peripheral device 300, the user terminal 200 may notify the peripheral device 300 of the registration of the peripheral device 300 and request the peripheral device 300 to register the user terminal 200 in the peripheral device 300.

The distinct information of the user terminal 200 may include at least one of an international mobile equipment identity (IMEI), an Android Identification (ANDROID_ID), a serial number, a phone number, a model number, and a media access control (MAC) address.

The international mobile equipment identity (IMEI) is a distinct identification number that is assigned to each of cellular phones. According to a guideline of a global system for mobile communications association (GSMA), every producers of cellular phones assign the international mobile equipment identity (IMEI) to each of the cellular phones. The international mobile equipment identity (IMEI) includes 15 digits (8 digits of an approval code, 6 digits of a model serial number, and a check digit), and is used for stopping a stolen phone from accessing a network.

In the system for preventing leakage of information according to example embodiments, the user terminal 200 may use an Android Identification (ANDROID_ID), which is generated when the user terminal 200 boots up for the first time and has 64 digits, a serial number, which is assigned to the user terminal 200 when the user terminal 200 is produced, a model number of the user terminal 200, and a phone number of the user terminal 200 as the distinct information of the user terminal 200. In addition, a media access control (MAC) address of the user terminal 200, which uses Wi-Fi or Bluetooth, may be used as the distinct information of the user terminal 200.

The user terminal 200 may transmit identification information of the application, which is requested to be executed by the user, to the peripheral device 300 together with the registration response message. Since the user terminal 200 transmits the identification information of the application, which is requested to be executed by the user, among a plurality of applications installed in the user terminal 200, the user terminal 200 may receive the core code file of the requested application from the peripheral device 300.

The peripheral device 300 may register the user terminal 200, which transmitted the registration response message (step S470). The peripheral device 300 may register the user terminal 200 using at least one of an international mobile equipment identity (IMEI), an Android Identification (ANDROID_ID), a serial number, a phone number, a model number, and a media access control (MAC) address of the user terminal 200.

After registering the user terminal 200, the peripheral device 300 may transmit the core code file of the application to the user terminal 200 (step S480). When the peripheral device 300 receives the identification information of the application from the user terminal 200 during the step S460, the peripheral device 300 may transmit the core code file of the application, which corresponds to the identification information of the application, to the user terminal 200.

After registering the user terminal 200 and the peripheral device 300 through the steps S440 to S480, the user terminal 200 and the peripheral device 300 may execute the application through the steps S490 and S500.

The user terminal 200, which received the core code file from the peripheral device 300, may execute the application (step S490). In some example embodiments, the user terminal 200 may execute the application using the core code file of the application and the normal code file of the application.

When the application is executed during the step S490, the user of the user terminal 200 may handle various kinds of businesses using the executed application. The application may correspond to an enterprise resource planning (ERP), an enterprise information portal (EIP), an enterprise application integration (EAI), a groupware, a knowledge management system (KMS), etc.

On the other hand, when the user terminal 200 is disconnected from the peripheral device 300, which stores the core code file of the application, the restriction on some of functions of the user terminal 200 may be released and the system for preventing leakage of information may be terminated. To increase a security level, the peripheral device 300 may store log data representing a connection status of the user terminal 200.

The application installed in the user terminal 200 may restrict some of functions of the user terminal 200 (step S500). The restricted functions may correspond to a function by which internal information may be leaked, such as a communication function, a camera function, a voice recording function, a storage function, a file transfer function, and a global positioning system (GPS) function.

In some example embodiments, when the application is executed, a communication function of the user terminal 200 may be restricted such that the user terminal 200 may not be able to transmit a text message, to make a phone call, and to send a message using a messenger. In other example embodiments, when the application is executed, a camera function of the user terminal 200 may be restricted such that the user terminal 200 may not be able to capture a still image or a video. In other example embodiments, when the application is executed, a voice recording function of the user terminal 200 may be restricted such that the user terminal 200 may not be able to record a meeting, a phone call, etc.

In other example embodiments, when the application is executed, a storage function of the user terminal 200 may be restricted such that the user terminal 200 may not be able to store an important data using a universal serial bus (USB) memory function. In addition, the user terminal 200 may be restricted such that the user terminal 200 may not be able to transfer a file to others. Alternately, a GPS function may be restricted, such that the user terminal 200 may not leak an important location information.

As described above, since some of functions of the user terminal 200, by which internal information may be leaked, is restricted by executing the application, a leakage of the internal information of the company can be prevented such that the internal information of the company can be effectively protected.

In addition, since the peripheral device 300, instead of the main server of the company, manages the user terminal 200, which is brought in the company, malfunction of a user terminal management system can be prevented, and whether the user terminal management system operates correctly can be checked intuitionally.

The foregoing is illustrative of example embodiments and is not to be construed as limiting thereof. Although a few example embodiments have been described, those skilled in the art will readily appreciate that many modifications are possible in the example embodiments without materially departing from the novel teachings and advantages of the present inventive concept. Accordingly, all such modifications are intended to be included within the scope of the present inventive concept as defined in the claims. Therefore, it is to be understood that the foregoing is illustrative of various example embodiments and is not to be construed as limited to the specific example embodiments disclosed, and that modifications to the disclosed example embodiments, as well as other example embodiments, are intended to be included within the scope of the appended claims.

REFERENCE NUMERALS

100: application providing server
200: user terminal
210: communication circuit
220: certification circuit
230: execution circuit
240: control circuit
300: peripheral device
310: communication circuit
320: storage device

What is claimed is:

1. A user terminal, comprising:
    a communication circuit configured to receive a normal code of an application from an application providing server to install the application, wherein the application providing server defines a core code using an execution file, which is generated by decompiling an application package and the application providing server further generates the normal code by deleting the core code from the application file;
    a certification circuit configured to receive a registration request message, which includes distinct information of a peripheral device, from the peripheral device storing the core code of the application, to certify the peripheral device, to transmit a registration response message, which includes distinct information of the user terminal, to the peripheral device, and to receive the core code of the application from the peripheral device;
    an execution circuit configured to execute the application using the normal code and the core code; and
    a control circuit configured to restrict at least one of functions of the user terminal while the application is executed.

2. The user terminal of claim 1, wherein the application includes at least one of an enterprise resource planning (ERP), an enterprise information portal (EIP), an enterprise application integration (EAI), a groupware, and a knowledge management system (KMS).

3. The user terminal of claim 1, wherein the control circuit restricts at least one of a communication function, a camera function, a voice recording function, a storage function, a file transfer function, and a global positioning system (GPS) function of the user terminal.

4. The user terminal of claim 1, wherein the distinct information of the user terminal includes at least one of an international mobile equipment identity (IMEI), an Android Identification (ANDROID_ID), a serial number, a phone number, a model number, and a media access control (MAC) address.

5. A method for preventing leakage of information using a user terminal, comprising:
    receiving, by the user terminal, a normal code of an application from an application providing server to install the application, wherein the application providing server defines a core code using an execution file, which is generated by decompiling an application package and the application providing server further generates the normal code by deleting the core code from the application file;

receiving a registration request message, which includes distinct information of a peripheral device, from the peripheral device storing the core code of the application to certify the peripheral device;

transmitting a registration response message, which includes distinct information of the user terminal, to the peripheral device;

receiving the core code of the application from the peripheral device;

executing the application using the normal code and the core code; and restricting at least one of functions of the user terminal while the application is executed.

6. The method of claim 5, wherein the application includes at least one of an enterprise resource planning (ERP), an enterprise information portal (EIP), an enterprise application integration (EAI), a groupware, and a knowledge management system (KMS).

7. The method of claim 5, wherein the restricting at least one of functions of the user terminal while the application is executed includes:

restricting at least one of a communication function, a camera function, a voice recording function, a storage function, a file transfer function, and a global positioning system (GPS) function of the user terminal.

8. The method of claim 5, wherein the distinct information of the user terminal includes at least one of an international mobile equipment identity (IMEI), an Android Identification (ANDROID_ID), a serial number, a phone number, a model number, and a media access control (MAC) address.

* * * * *